United States Patent [19]
Bergström et al.

[11] Patent Number: 5,587,863
[45] Date of Patent: Dec. 24, 1996

[54] DIGITAL INTERFACE UNIT

[75] Inventors: Jan O. Bergström; Lars Liljegren; Ove Skarhed; Anders Årenäs, all of Västerås, Sweden

[73] Assignee: Asea Brown Boveri AB, Vasteras, Sweden

[21] Appl. No.: 608,950

[22] PCT Filed: Mar. 23, 1992

[86] PCT No.: PCT/SE92/00178

§ 371 Date: Jan. 26, 1994

§ 102(e) Date: Jan. 26, 1994

[87] PCT Pub. No.: WO92/17829

PCT Pub. Date: Oct. 15, 1992

Related U.S. Application Data

[63] Continuation of Ser. No. 122,472, Jan. 26, 1994.

[30] Foreign Application Priority Data

Apr. 2, 1991 [SE] Sweden ................... 9100951

[51] Int. Cl.⁶ ........................................... H02H 3/00
[52] U.S. Cl. ........................................ 361/93; 361/103
[58] Field of Search ....................... 361/56, 57, 93, 361/98, 100, 101, 103, 18; 364/140, 141, 483, 492, DIG. 1, DIG. 2; 341/141; 395/830, 832, 834

[56] References Cited

U.S. PATENT DOCUMENTS

| | | |
|---|---|---|
| 4,593,380 | 6/1986 | Kocher et al. .................... 364/141 |
| 4,628,397 | 12/1986 | Gareis et al. ..................... 361/98 |
| 4,951,250 | 8/1990 | Cruickshank et al. ............. 361/98 |

OTHER PUBLICATIONS

ASIC Like HVIC for Interfacing to Half-Bridge Based Power Circuits; Mansmann et al.; PESC '88 Record (Apr. 1988).

*Primary Examiner*—Jeffrey A. Gaffin
*Assistant Examiner*—Ronald W. Leja
*Attorney, Agent, or Firm*—Watson Cole Stevens Davis, PLLC

[57] ABSTRACT

The present invention relates to a device for adaptation of digital input signals (DI) or output signals (DO) and which, per se, exhibits the functions selection between utilization of the device as binary input or output unit, selection of cable supervision, selection of current level warning, selection of current limiting level, selection of temperature level warning, selection of temperature protection and selection of voltage range. By access to the functions current limiting level and overtemperature protection, unlimited faulty connection under current and voltage conditions within the field of application may be allowed. All of the enumerated functions are accomodated within one and the same electronic unit, which is achieved by a far-reaching integration of the components used in few integrated circuits. The selection of function mode is obtained by a simple programming.

13 Claims, 7 Drawing Sheets

DIGITAL INTERFACE UNIT

This application is a File Wrapper Continuation Application of application Ser. No. 08/122,472, filed Jan. 26, 1994, now abandoned.

TECHNICAL FIELD

The present invention relates to a device for adaptation of signals in an electrical system in which members in the form of sensors, actuators or similar members are fed with digital output signals from the device or in which these members feed the device with digital input signals.

BACKGROUND ART

In connection with communication between electrical units, for example when electrical members of various types communicate with an electronic unit for conveying information to or collecting information from these members, demands for signal adaptation between the electrical units will immediately arise. To carry out this signal adaptation, an input or output unit can be connected nearest the electrical member, which input or output unit is intended to see to the need of signals of the connected member or the electronic unit with respect to current and voltage level as well as signal type. Both analog and digital signal types occur. In this description only digital signal types are described.

In modularized electronic building systems, special input and output units, I/O units, occur, in this case digital I/O units, DI/DO, which take care of the above-mentioned signal adaptation. Such building systems are utilized, for example, within car electronics and industrial process adaptation systems. To cover as many of the signal types occurring as possible, the DI/DO units are designed with a plurality of different functions for adaptation to various demands. The relevant functions of a DI/DO unit are primarily its use as DI unit or DO unit as well as cable supervision, current level warning, current level limitation, temperature level warning, overtemperature protection and the possibility of selection of the voltage range.

All of the above functions are each currently realized in known technique within the field. To be able to satisfy different requirements for fields of applications for DI/DO units, such units have been designed in a number of different variants corresponding to different specifications of requirements. This causes problems in the design and installation of electronics systems according to the above, since each individual DI/DO unit must be specified. A requirement for realization of one single DI/DO unit will naturally arise, which, per se, comprises all of the above desirable functions.

Modularized DI/DO units already exist on the market, which units integrate several of the above-mentioned functions in one and the same module, however, not all of those enumerated above at the same time. In the following description, a DI/DO module will be described which claims to possess all of the above-mentioned functions available and integrated in one and the same module.

SUMMARY OF THE INVENTION

The present invention comprises a device for adaptation of digital input signals or output signals and which, per se, exhibits the following functions: selection between utilizing the device as a binary input or output unit, selection of cable supervision, selection of current level warning, selection of current limiting level, selection of temperature level warning, selection of temperature protection, and selection of voltage range. By having access to the functions current limiting level and overtemperature protection, unlimited faulty connection under current and voltage conditions within the field of application may be allowed. All of the enumerated functions are housed within one and the same electronic unit, which is achieved by a far-reaching integration of the components used in few integrated circuits. The selection of the function mode is obtained by a simple programming.

The far-reaching integration of the invention, which at the same time comprises the above-mentioned supervision functions, is made possible by utilizing power MOSFET circuits, called PMF, integrated as application specified integrated circuits, usually called ASIC circuits. These ASIC circuits comprise power MOSFET transistors adapted to realize the above-mentioned supervision and protection functions.

The principal characteristics of the DI/DO unit according to the invention can be summarized as follows:

the same device can be used as either digital input unit or digital output unit, the same device can be used for all feasible voltages within the field of application, the device has different types of protection and supervision functions, and the function mode is selected by an operative setting which programs the device with respect to functions.

When using the device as a digital output unit, the following functions are possible to use, either separately or jointly:

Function mode a:

Current limitation.
  Used to protect the DO unit from transient overloads. The temperature sensing function mentioned below is too slow for this purpose.

Overcurrent detection.
  Activates a warning when the current reaches a certain fixed value.

Voltage feedback.
  The voltage across the DO unit is measured in order to sense whether the unit is operating as expected.

Function mode b:

Detection of open circuit.
  When the DO unit is switched on, a warning for open circuit is activated when the current is lower than a certain determined minimum value. On the other hand, when the unit is switched off, a small leakage current, somewhat larger than said minimum value, flows through the DO unit. A warning that the circuit is open is then activated if the current is lower than said minimum value.

Function mode c:

Protection against overtemperature.
  This function is utilized to protect the DO unit against overload. The DO unit is switched off when the temperature exceeds a certain value.

Warning against overtemperature.
  A function which provides information that a certain preset temperature level has been reached, in which case a warning is activated.

When employing the device as a DI unit, four different digital input signal modes are defined:

d) Continuous digital signal feed without cable supervision.

e) Continuous digital signal feed with cable supervision.
f) Pulsed digital signal feed without cable supervision.
g) Pulsed digital signal feed with cable supervision.

In the case of continuous signal feed, a continuous current flows through the DI unit. In the case of pulsed digital signal feed, only short current pulses flow through the DI unit. The advantage of pulsed DI is that a lower power dissipation is obtained. Pulsed DI units are used only in combination with direct voltage feed.

In the same way as in the unit operating as a DO unit, all functions for overcurrent, overvoltage and overtemperature supervision mentioned above are available when the unit serves as a DI unit.

A brief summary of the mode of operation of the DI unit in the different modes will be given.

In operation according to mode d), the unit fulfils the requirements for signal adaptation equipment compiled in the standard proposals according to IEC 65A/WG6/TF4. The principle of current limitation of the DI signals fulfils both class I and class II input signal levels. The voltage on the input side has been assigned a threshold value, above which, according to the above standard, the status for the digital input signal shows position "on". Below the threshold value, the corresponding status is "off". The total current through the unit at the input is limited to a certain operating value. The digital input signal status can thus be determined by measuring the voltage on the input side.

Operation according to mode e) utilizes external resistors to make possible cable supervision. The input resistance for the IO unit is dimensioned to be small compared with the external resistors. This means that the total current at the input is almost entirely determined by the external resistances. Further, this means that the total current can be utilized for determining the impedance level in the form of an open circuit, off, on, or a short circuit. As mentioned above, power MOSFET circuits occur in the DI unit. To protect these circuits, the current is limited to a maximum value.

In the operating mode according to f), the function is the same as in mode d), but the DI unit is switched on only for brief periods of time. The unit has a high impedance between these periods.

Finally, in operation according to mode g), the IO unit exhibits the same function as in mode d) and the same time progress as in mode f).

By a suitable selection of current limit, the unit fulfils the requirements for both class I and class II input signal levels according to the above-mentioned standard proposal.

The unit is programmed for its functions from a superordinate electronic unit by select signals and threshold values for voltages and currents setting the DI/DO unit to act in accordance with the intended function.

A DI/DO unit according to the invention considerably facilitates, for example, design, installation and service of electronic systems in which digital interface units are utilized. One single type of I/O units fulfils the requirements for most of the cases of digital signal adaptation occurring. This means that during installation in a process control system, it is not necessary to know in advance the distribution between DI channels and DO channels or the voltage levels thereof, which entails great savings and gain in time. A valuable protection against faulty switching or connection of faulty supply is obtained. This applies both to the DI and the DO units.

An application of a digital interface unit according to the invention, miniaturized and integrated in the described manner, constitutes its use in a process control system. The far-reaching integration of the interface unit makes possible the production of single-channel digital interface units housed in small modules. These digital interface modules make it possible to distribute interface units closer to external electrical members in a process, whereby communication between the interface module and a supervision unit, for example a computer, takes place via a databus. Modules of the kind mentioned may be mounted on standard mounting rails, where communication by means of the supervision unit takes place via conducting paths located in or on the surface of the mounting rail. In such an application, the use of multi-channel process interface circuit boards collected in centrally located cubicles will become superfluous.

BRIEF DESCRIPTION OF THE DRAWINGS

FIG. 2a illustrates the time progress when utilizing open-circuit detection in a DO unit, and.

DESCRIPTION OF THE PREFERRED EMBODIMENTS

An example of a preferred embodiment of a DI/DO unit with characteristics according to the appended claims will be described in the following with reference to the accompanying figures.

Figure 1:
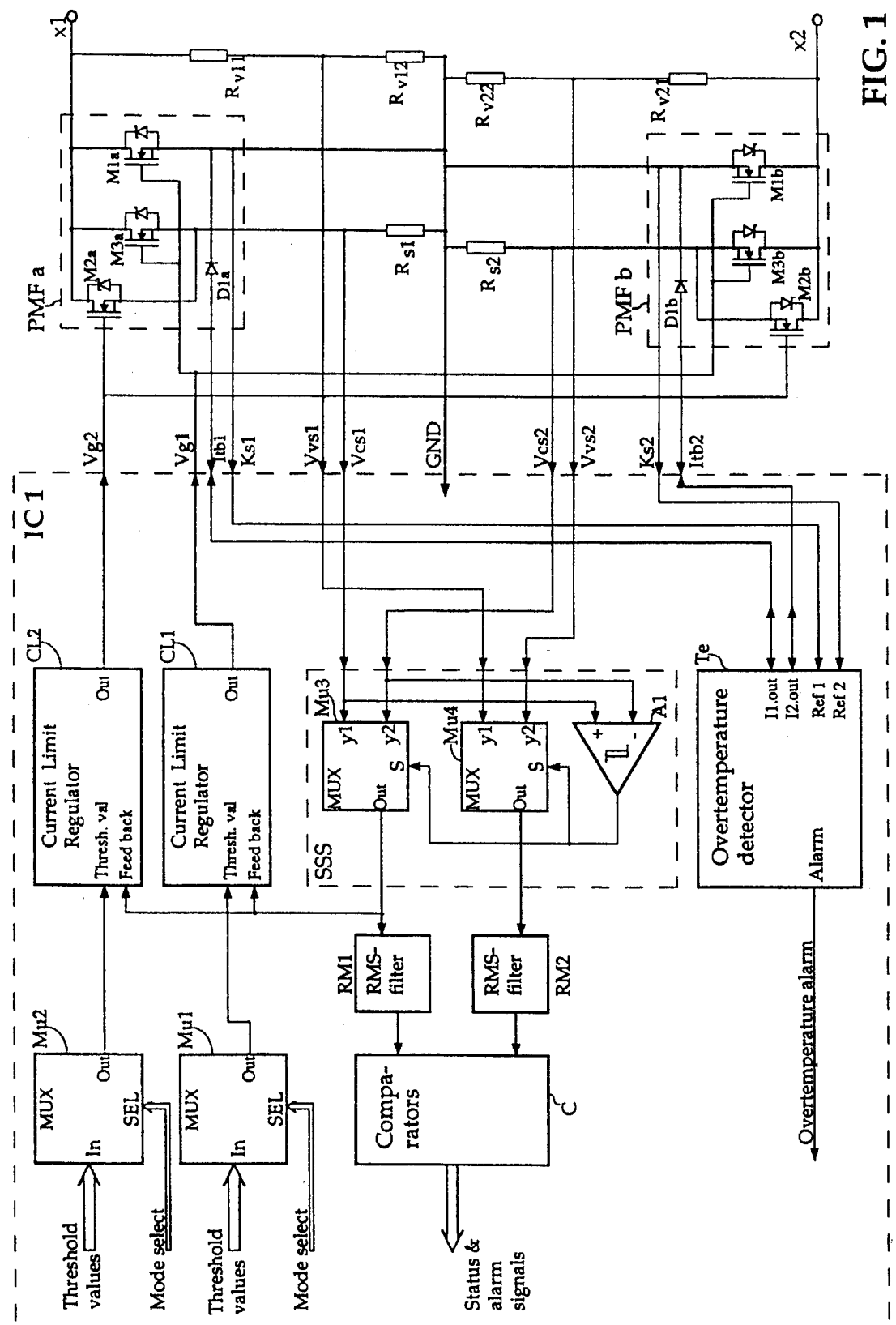
FIG. 1 illustrates a system diagram of a DI/DO unit according to the present description.

As will be clear from FIG. 1, the DI/DO unit is realized in a far-reaching integrated embodiment. IC1 represents a so-called ASIC circuit. This accomodates all the blocks which have been described as belonging to IC1 and which are consequently built up in an integrated design.

In addition, the DI/DO unit comprises two identical power MOSFET circuits PMFa, PMFb, the function of which will first be described.

Figure 2A:
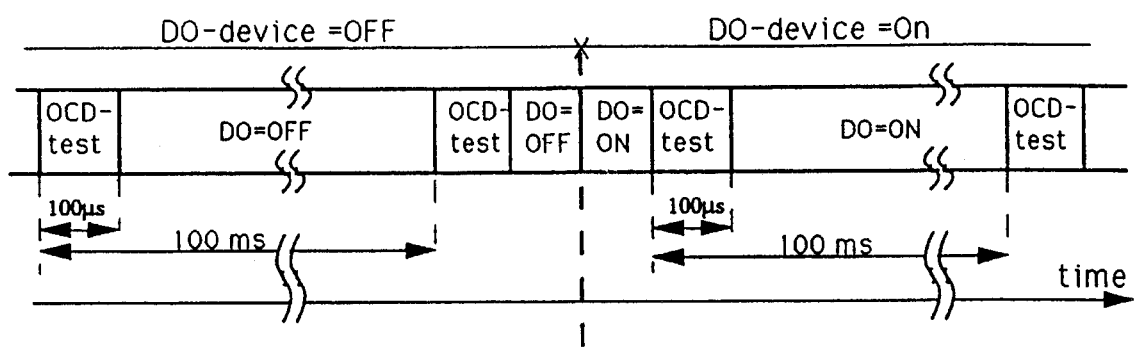
Figure 2B:
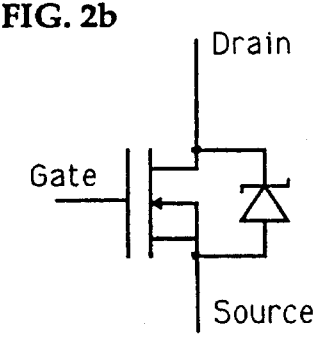
FIGS. 2b–2d explain the principle of using the PMF transistors included in the DI/DO unit.

FIG. 2b shows the diagram of a DMOS N-channel power MOSFET transistor. The zener diode symbolized in the figure refers to an internal parasitic diode present in the MOSFET transistor. Thus, the-symbol mentioned does not correspond to any external diode. It should also be mentioned that an IGBT transistor may replace the MOSFET transistor in the applications.

Figure 2C:
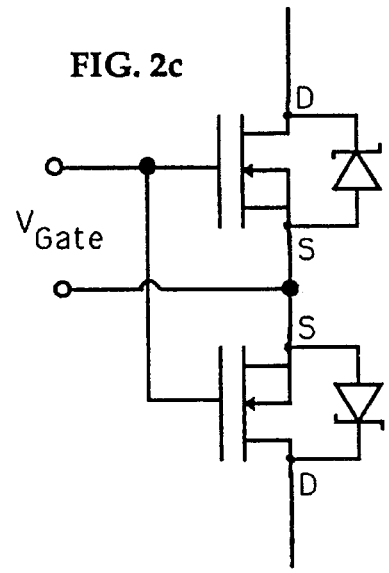

In the DI/DO unit two power MOSFET transistors are joined in a common source coupling illustrated in FIG. 2c. The parasitic diodes are used here to produce an AC switch.

Figure 2D:
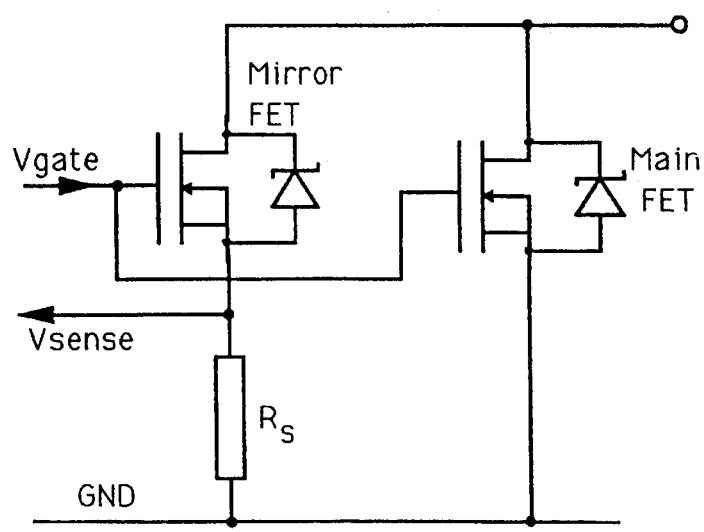

A current mirror, mirror FET, is utilized to make possible measurement of the current in the main MOSFET transistor, main FET, which is shown in FIG. 2d. The current through the current mirror may be converted into a voltage by using a current-voltage convertor.

The DI/DO unit according to FIG. 1 comprises two identical power MOSFET circuits, PMFa, PMFb, which are built up as ASIC circuits. In these circuits, a main transistor M1a, M1b of N-channel DMOS type occurs in the embodiment. To illustrate the above-mentioned common source connection, the two PMF circuits are inverted, such that the source connections of the main transistors M1a, M1b in the respective PMF circuits are interconnected. An additional power MOSFET M3a, M3b is utilized as the above-mentioned current mirror.

The resistors Rs1 and Rs2, connected between the current mirrors M3a, M3b and zero potential GND, are used to convert the current through the current mirror M3a, M3b into a voltage. The voltage dividers $R_{v11}/R_{v12}$ and $R_{v21}/R_{v22}$ are used to measure the drain-source voltage. Current measurement may, of course, be performed in other ways, for example with the aid of transimpedance amplifiers, when the resistors $R_{s1}$ and $R_{s2}$ are not needed.

The circuit IC1 is a control circuit for control of the mode of operation of the PMF circuits. Hereinafter, therefore, IC1 will be designated control circuit. The control circuit and the PMF circuits may alternatively be integrated in one single common ASIC circuit.

The selection between utilizing the device as a DI or DO unit is made by utilizing the PMF circuits M1a, M1b, M2a, M2b, M3a, M3b in different ways. By a suitable selection of select signal to a first multiplexor Mu1, which selects the value of a threshold voltage to a current limit regulator CL1, the output voltage is set at 0 V at the output Vg1 when the device is intended to be used as a DI unit. In this case, only one PMF transistor M2a, M2b in the respective PMF circuit PMFa, PMFb will be utilized. The other PMF transistors M1a, M1b, M3a, M3b are disconnected by supplying their respective gate with the voltage 0 V via the output Vg1. The block CL1 comprises an operational amplifier with the two inputs Thresh. val and Feedback. If, for example, the input Thresh. val is given a lower voltage than the input Feedback, the output signal Vout from the amplifier will be given the value 0 volt. Since $V_{feedback}$ is always greater than or equal to zero, Vout will assume the value 0 volt if $V_{Thresh.val}$ is given a negative arbitrary value. If mode select is given a value which corresponds to the use Digital Input, DI, an arbitrarily negative value will be connected via the first multiplexor Mu1 to the block CL1 in the embodiment.

In use as a DO unit, a load $Z_L$ is connected across the output x1, x2 and in series therewith a voltage source U. As will be clear from the description and FIGS. 3 and 6, process equipment is always connected between output x1 and output x2 in all modes, that is, both in digital input mode and digital output mode.

The device will first be described in its application as a DO unit. This may then be driven in different modes depending on the externally selectable presettings in two multiplex units Mu1, Mu2 integrated in the circuit IC1. The different modes independent of each other are a) current limiting function, CL, b) open-circuit detection, OCD, and c) overtemperature protection, OTP.

The current limiting function is achieved by feeding back current detection voltages Vcs1, Vcs2 to the control circuit IC1, where these voltages are fed in via the inputs y1 and y2, respectively, to a third multiplex unit Mu3 and also via the two inputs to a comparator A1. Both of these units mentioned, the third multiplex unit Mu3 and the comparator A1, are arranged, together with an additional fourth multiplex unit Mu4, integrated in a sense signal selector SSS, which in its entirety is integrated in the ASIC circuit which constitutes the control circuit IC1.

When the device is utilized as a DO unit, a current flows through MOSFET M1a, MOSFET M1b and the load $Z_L$. Current sensing is carried out in the mentioned current mirrors M3a and M3b. The current direction is detected by sensing which of the signals Vcs1 and Vcs2, respectively, is the greater. This sensing is performed by the comparator A1, which by means of a select signal changes the third multiplexor Mu3 and thereby ensures that a relevant sensed signal Vcs1, Vcs2 is connected via the multiplexor Mu3 to the current limit regulator block CL1, the output signal Vg1 of which controls the current through the PMF circuits and, when the permissible current level is exceeded, limits the current therethrough.

The comparator A1 also delivers its output signal to a comparator C which, in dependence on the magnitude of the measured current, is able to transmit a signal which activates a warning for exceeding a certain pre-determined current level and a signal which advises that current limitation is activated when the preset current limiting value has been reached in the current through any of the main MOSFET transistors M1b,M1b. In the function mode described, neither the second current limit regulator unit CL2 nor the fourth multiplex unit Mu4 is utilized. The current limit is selected automatically as a function of selected (programmed) nominal working voltage.

In a function mode b, as mentioned above, it can be sensed whether the output circuit of the DO unit is open or loaded via the outputs x1, x2. This open-circuit detection OCD may be carried out both in the on- and in the off-position of the DO unit. Open-circuit detection is carried out with a pulsed, non-continuous signal. The pulse interval of this signal may be approximately 100 ms, as in the embodiment according to FIG. 2. According to the example, the figure shows that with the DO unit in the off-position, an OCD test is performed with a signal pulse for a period of 100 μs, whereafter the DO unit is in the off-position without OCT test for the remainder of the pulse interval. Then follows the next signal pulse, which again performs the OCD tests etc. This continues until the state of the DO unit is switched to the on-position. After such a switch-on, the DO unit is in the on position without an OCD test until a pulse for OCT test occurs, and such a test is then performed during the time interval 100 μs. The unit returns to the on-position without OCT test for the remainder of the pulse interval 100 ms, whereafter a new signal pulse activates an OCD test etc. In this case, in the on-position, also the other function modes which may have been selected are active.

Figure 3:
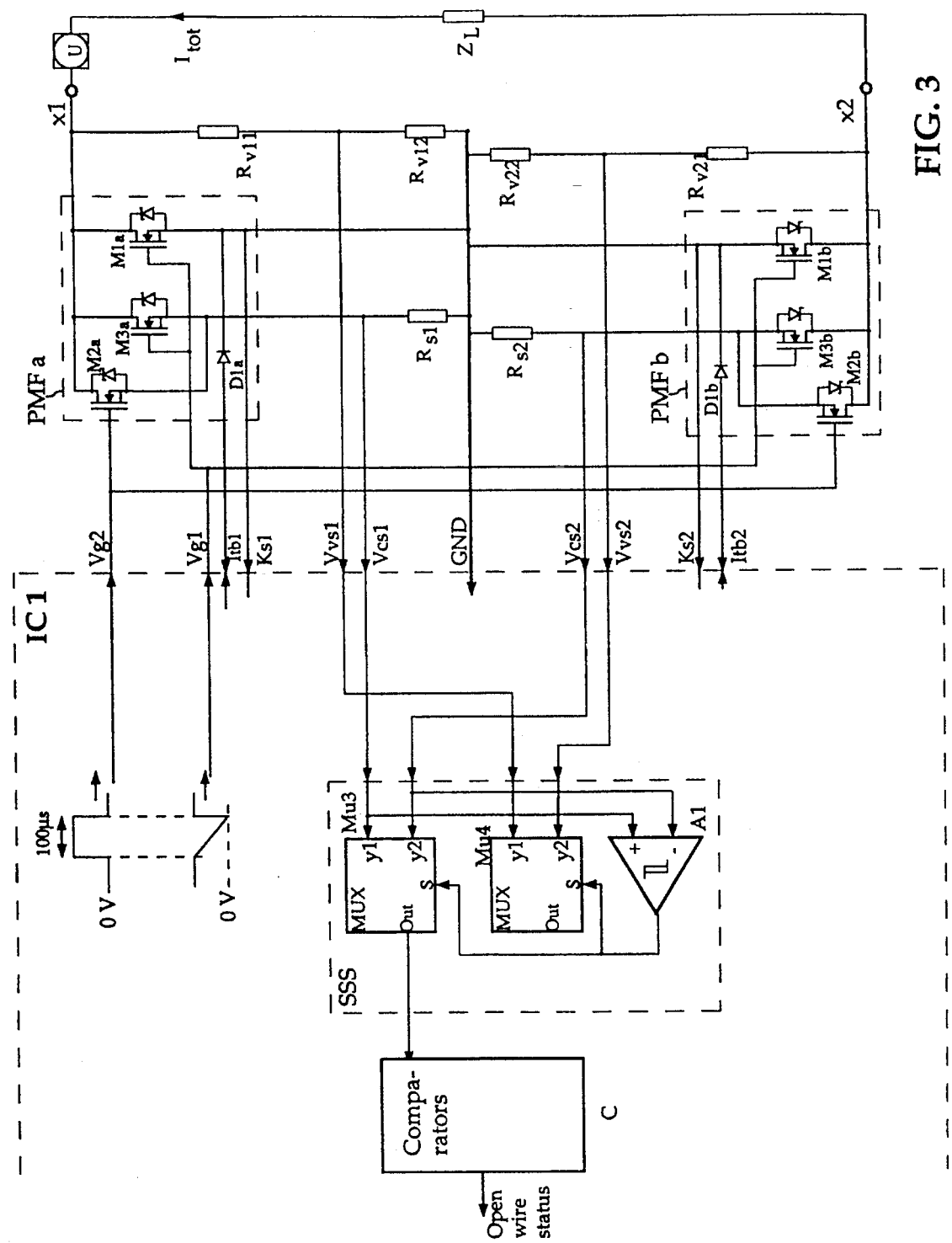
FIG. 3 shows the principle of open-circuit detection for the DO unit in the "on" position.

The function of the DO unit in mode b with the unit in the on-position is clear from FIG. 3. From this figure it is clear that a load $Z_L$ and a external voltage source U are connected in series with the output x1, x2 of the DO unit in this mode. By open circuit is meant in this function mode with open-circuit sensing that the current through the PMF circuit, $I_{tot}$, is smaller than a certain selected value, in the example 7 mA. When open-circuit detection is carried out, the MOSFET transistors M2 of the PMF circuit are opened by applying a voltage via Vg2 to the gate of the transistor M2 with a voltage pulse. At the same time, the main MOSFET transistor M1 is cut off by applying a ramp pulse with a decreasing voltage via Vg1 to the gate of the transistor M1. If the total PMF current $I_{tot}$ is greater than 7 mA, which is the case when the circuit is not open, the voltage Vcs1 or Vcs2 increases to a value above a certain fixed voltage level. When Vcs1 or Vcs2 is detected to exceed this fixed voltage level, the OCD test is immediately interrupted. If, on the other hand, the total PMF current $I_{tot}$ is lower than the above-mentioned 7 mA, which is the case when the circuit is open, the voltage Vcs1 or Vcs2 will never exceed the above-mentioned fixed voltage level. Indication of status is given by the comparator C.

Figure 4:
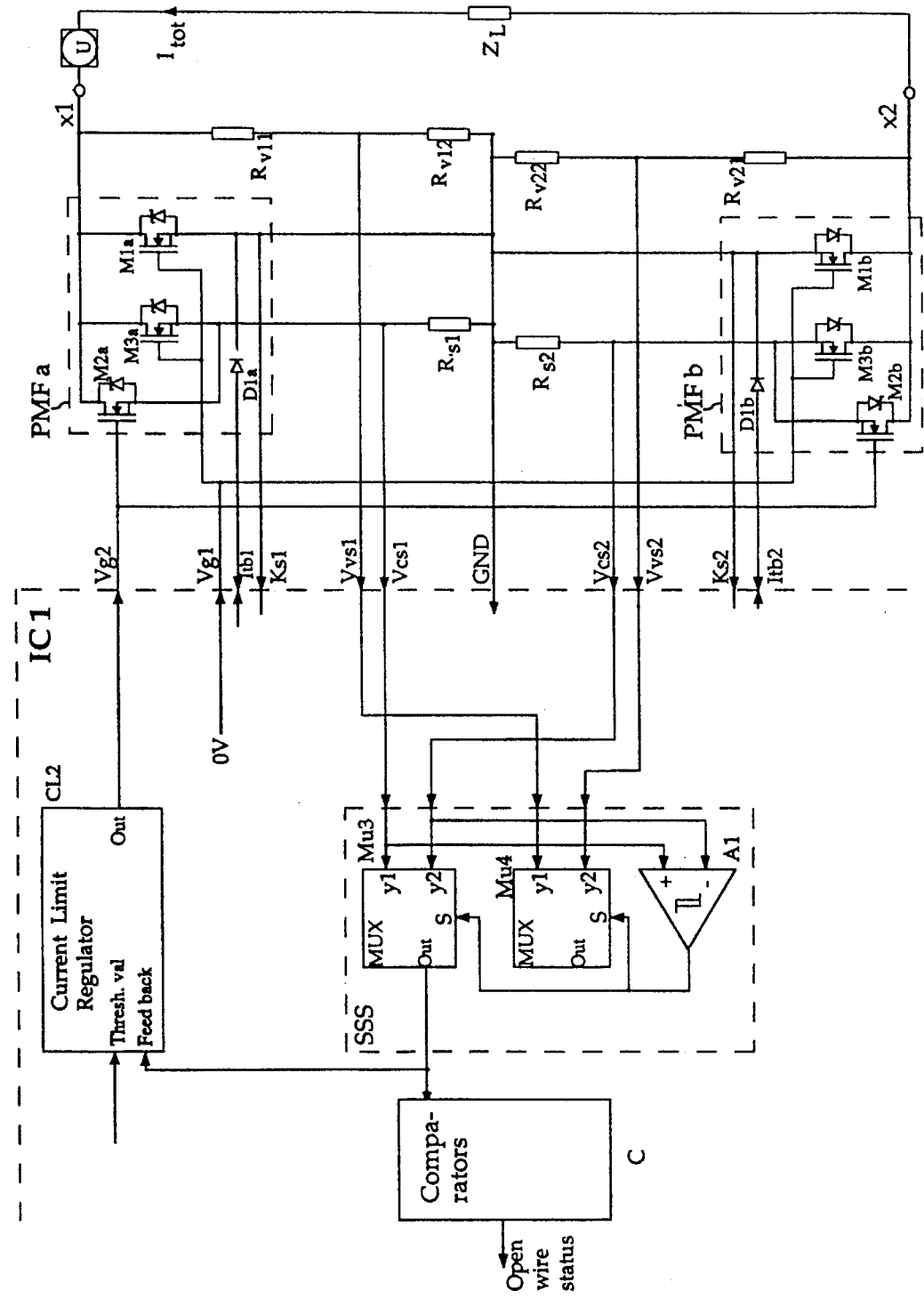
FIG. 4 illustrates the diagram when utilizing open-circuit detection with the DO unit in the "off" position.

Open-circuit detection with the DO unit in the off-position is illustrated in FIG. 4. In this case the test is performed by controlling MOSFET M2 to a low-impedance state. The control circuit IC1 limits the current in the embodiment to 8 mA. If the current $I_{tot}$ through the PMF circuit is smaller than 7 mA, the circuit is considered open. Indication of this is given by a status signal from the comparator C.

Figure 5:
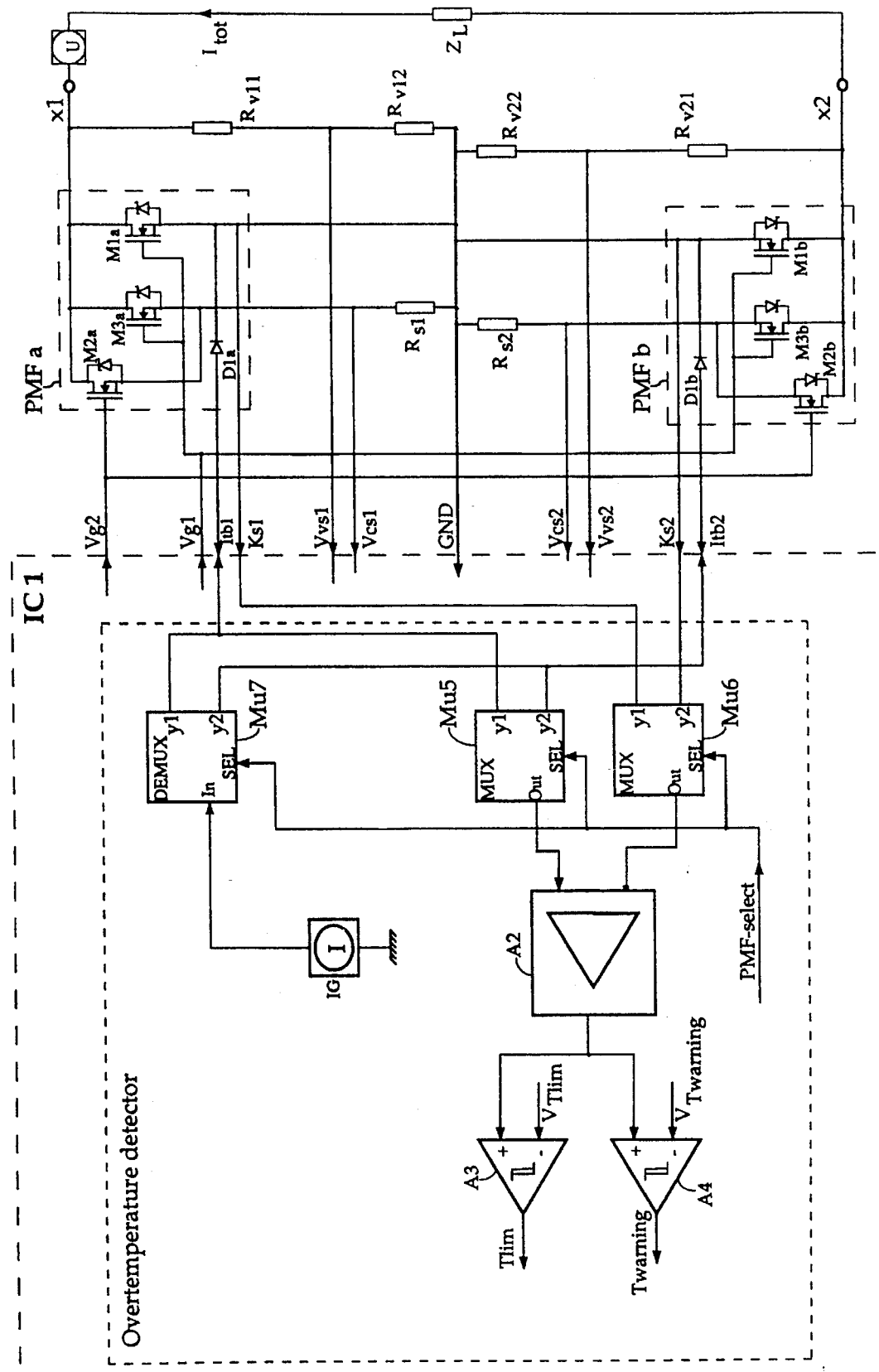
FIG. 5 illustrates the principle of temperature supervision in a DO unit according to the invention.

The PMF circuit comprises diodes D1a, D1b for temperature supervision. The temperature is measured by determining the forward voltage drop across the diode D1a, D1b when a current in the forward voltage direction is carried through the diode in the respective PMF circuit. FIG. 5 illustrates the configuration for the temperature supervision, where the diagram of an overtemperature detector circuit, Te, integrated on the ASIC circuit is shown in block structure. Temperature measurement is carried out alternately for one PMF circuit at a time. To achieve this, two multiplex units Mu5, Mu6 and one demultiplexor DEMUX are utilized. Depending on the variations in a PMF select signal to the three multiplex units Mu5, Mu6, DEMUX, the temperature measurement alternates between the two PMF circuits. The necessary current for the measurement of the forward voltage drop mentioned is obtained from a current generator IG, which, for example; during measurement of the temperature in PMFa, supplies current via the output Itb1 over the diode D1a and to ground. A problem is that a large current may flow through MOSFET M1a and that a not neligible voltage drop in a bond wire in the transition between the ground and the ASIC circuit may occur if the forward voltage drop should be measured directly between the output Itb1 and ground. To avoid this, an extra pilot wire between the measuring output Ks1 is arranged in the PMF circuit PMFa and connected near the cathode of the diode D1a. In this way, the voltage across the diode can be measured in a high-impedance manner in accordance with the principle of four-wire measurement. The measurement is performed in a corresponding way in the second PMF circuit PMFb. Temperature supervision is performed in the same way in DI mode.

The relevant forward voltage drop across the respective diode D1a, D1b corresponding to the relevant temperature value of the respective PMF circuit is forwarded via the multiplex units Mu5, Mu6 to a second amplifier A2 and is then distributed between a third A3 and a fourth A4 amplifier of comparator type, where the third amplifier is also fed with a signal $V_{Tlim}$ which constitutes a reference for the temperature limit and where the fourth amplifier is also fed with a signal which corresponds to the value of a set temperature warning $V_{Twarning}$. The third A3 and fourth A4 amplifiers deliver signals $T_{lim}$ and $T_{warning}$, respectively, at their outputs when temperature values corresponding to these signals are attained inside the PMF circuit.

Switching the DI/DO device for use as a DI unit is carried out according to the above by utilizing only MOSFET2 M2a, M2b in the PMF circuits. The other two MOSFET transistors M1, M3 are disconnected, which is accomplished by setting the voltage at the gate of these two transistors at 0 V. When using the device as a DI unit, there is a possibility of operating this in four different function modes, independently of each other, namely, d) continuous without cable supervision e) continuous with cable supervision f) pulsed without cable supervision g) pulsed with cable supervision.

When using the device as a DI unit without cable supervision, a switch SW or other arbitrary sensor with a binary output signal is connected into the output x1, x2 of the device. With cable supervision two resistors are also connected to the output, the first resistor Rsv1 in series with the load and the second resistor Rsv2 in parallel with the load.

Figure 6:
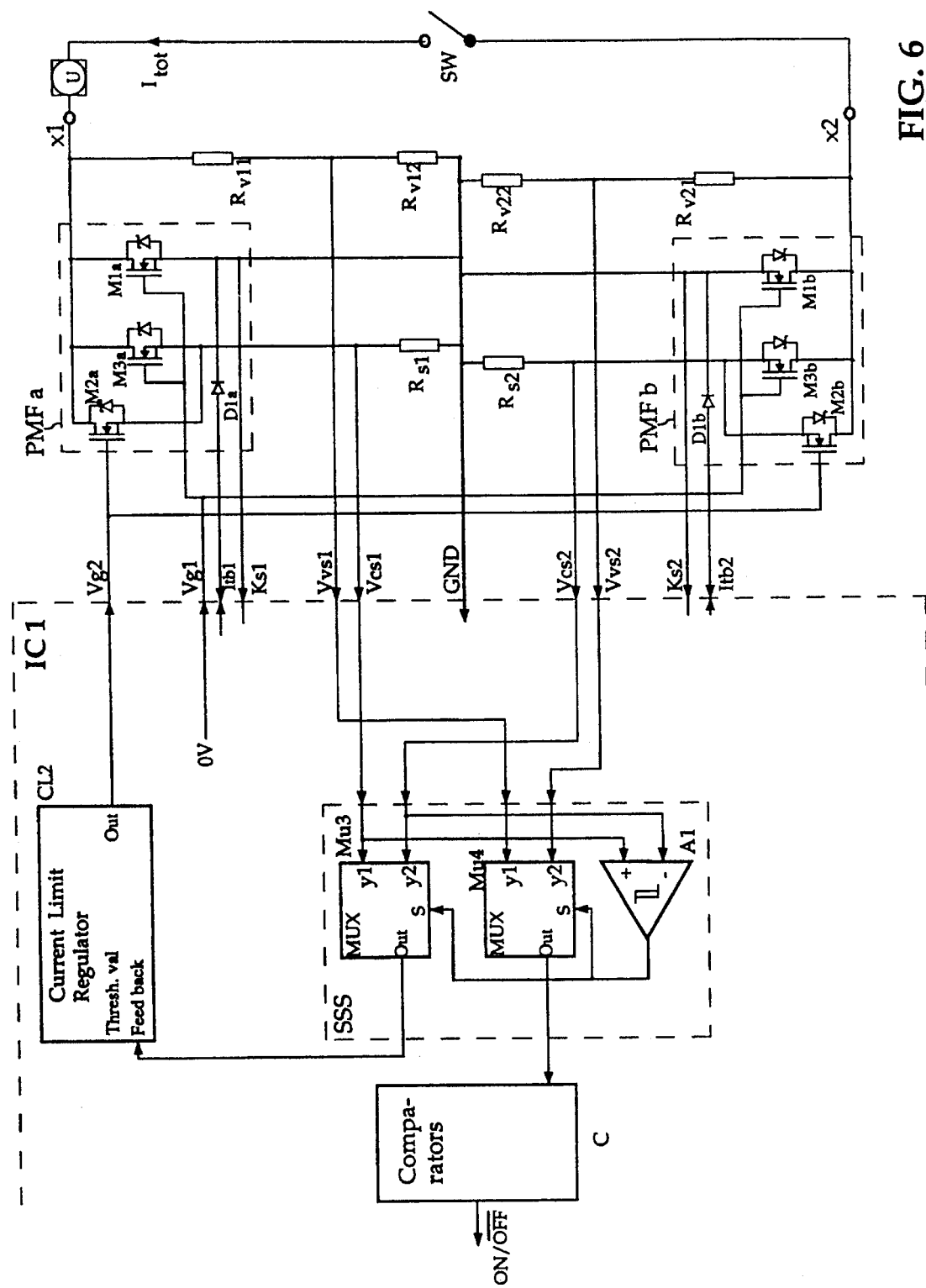
FIG. 6 schematically shows the DI unit without the cable supervision function in the case of continuous supply.

Schematically, the principle of function mode d is shown in FIG. 6. The diagram for this function mode is very similar to the function in open-circuit detection according to FIG. 4. In the sense signal selector SSS in this mode, however, the third multiplex unit Mu3 only sends a feedback signal to the CL2 circuit whereas the output of the fourth multiplex unit Mu4 is connected to the comparator C. The comparator A1 senses which of the input signals Vcs1 and Vcs2 is the greater and switches by a select signal the third multiplexor Mu3 and the fourth multiplexor Mu4 for sensing of the input signals Vvs1, Vcs1 or Vvs2, Vcs2 which are of interest for the moment. If instantaneously the PMF circuit. PMFa is the relevant one, the current corresponding to the current intensity supplied to the DI unit is sensed by means of the magnitude of the voltage signal Vcs1. This voltage is fed via the third multiplexor Mu3 to the feedback in the current limit regulator block CL2, whereby the current supplied to the DI unit can be controlled via the gate on MOSFET2. Via the voltage dividers Rv11 and Rv12, the signal Vvs1 is obtained which feeds the comparator C via the fourth multiplexor Mu4. In the comparator C, the value of the signal Vvs1 is compared with values of preset levels in the comparator C, thus enabling the state of the switch SW to be determined and a possible overvoltage to be detected. In a similar way, the measurement takes place in the second PMF circuit PMFb. The preset levels in the comparator C correspond to values of the input voltage to the DI unit. With the signal Vvs1 and Vvs2, respectively, fed via the fourth multiplex unit Mu4 to the comparator C, a status signal is obtained from the comparator, which signal, in dependence on the magnitude of the sensed signal, determines whether the DI unit is in the on- or off-position.

Figure 7:
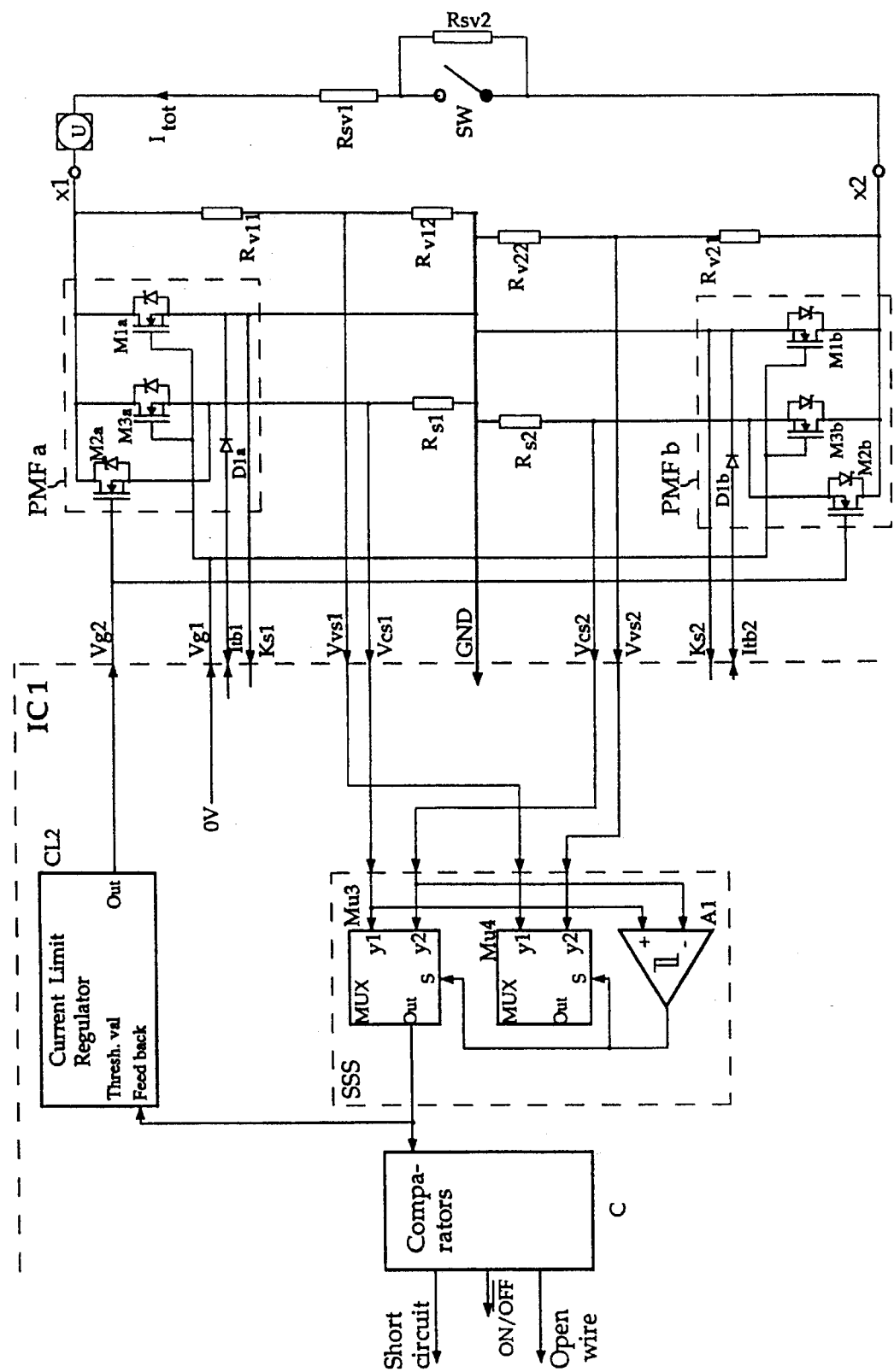
FIG. 7 schematically shows the DI unit with an activated cable supervision function in the case of continuous supply.

With cable supervision in accordance with function mode e, shown in FIG. 7, output signals are obtained from the comparator which provide information about short circuit, open circuit and the on-off position. The comparator A1 senses which of the input signals Vcs1 and Vcs2 is the greater and switches, by a select signal, the third multiplexor Mu3 and the fourth multiplexor Mu4 for sensing of which of the input signals Vcs1 and Vcs2 is of interest for the moment. If instantaneously the PMF circuit PMFa is the relevant one, the current corresponding to the current intensity supplied to the DT unit is sensed by means of the magnitude of the voltage signal Vcs1. This voltage is supplied via the third multiplexor Mu3 to the feedback in the current limit regulator block CL2, whereby current supplied to the DI unit can be controlled via the gate on MOSFET2. The signal Vcs1 also supplies the comparator C via the third multiplexor Mu3. In the comparator C, the value of the signal Vcs1 is compared with values of preset levels in the comparator C, enabling the state of the DI unit to be determined. In a similar way, the measurement takes place in the second PMF circuit PMFb. The preset levels in the comparator C correspond to values of the input current to the DI unit. Below a certain first current level, the circuit at the input x1, x2 is considered open. Between this first current level and a second higher current level, the state of the DI unit is considered to be "off". Above this second current level and below a higher third current level, the DI unit is in the on-position. Finally, above a third current level, the input x1, x2 is considered to be short-circuited. Status signals from the comparator C provide information about the current state of the DI unit.

In function mode f, pulsed without cable supervision, the diagram is the same as in function mode d, with the difference that the PMF transistors are opened for a short period by means of a pulse. The DI unit is active during the pulse duration. Both the gate voltages Vg1 and Vg2 are set equal to zero between opening pulses, which closes the PMF circuits and renders the DI unit inactive.

Function mode g, pulsed with feedback, has the same function diagram as function mode e, but with the difference that the PMF transistors are closed periodically between opening pulses which activate the DI unit. Both the gate voltages Vg1 and Vg2 are set equal to zero between opening pulses and thus render the DI unit inactive.

The method using pulsed activation of the DI unit gives lower power development and hence reduced heating in the PMF circuits as well as a lower degree of utilization thereof and, in addition, entails a reduced power requirement in a supply device which supplies a sensor with current.

We claim:

1. An integral digital signal interface for interfacing between an electronic control unit (ECU) and external electrical process equipment (EEPE), said interface having input terminals for receiving control signals from said ECU and output terminals for transmitting signals for controlling said EEPE, said digital signal interface comprising:

control means for receiving mode select signals from said ECU for selectively programming the interface to operate in digital output/input modes and for receiving threshold input values from said ECU to perform a plurality of functions for controlling the interface and for providing operating functions with respect to controlling said EEPE;

said control means including: at least one multiplexor for receiving at least one of said mode select signals and at least one of said threshold input values from said ECU; a first current limit regulator responsive to an output of said at least one multiplexor, power MOSFET circuits (PMCs) responsive to an output of said first current limit regulator for selectively switching said interface into respective digital input (DI) and digital output (DO) modes, and the interface is correspondingly set to receive input data/control signals from the ECU or to function to generate respective output signals for controlling the EEPE.

2. An integrated digital signal interface according to claim 1, wherein said control means further including: a second multiplexor for receiving other of said mode select signals and other of said threshold input values from said ECU; a second current limit regulator responsive to the output of said second multiplexor, said first and second current limit regulators providing respective output signals for controlling respective ones of said PMCs for protection against faulty connection of the interface to the EEPE in the DO mode.

3. An integrated digital signal interface according to claim 2, wherein said PMCs further including first voltage dividers connected between said PMCs and functioning as voltage converters for changing current to a voltage output and second voltage dividers connected between the output terminals for measuring a respective characteristic voltage of said PMCs; and said control means further including a sense signal selector (SSS) circuit responsive to said voltage output for providing a current limiting function of the current flowing through said PMCs and generating a signal indicating that a current limiting function is activated with said interface in a DO mode.

4. An integrated digital signal interface according to claim 3, wherein said first current limit regulator is responsive to the output of said SSS circuit for providing protection against faulty load of the interface in the DO mode.

5. An integrated digital signal interface according to claim 3, wherein said control means further including at least one comparator connected to the output of said SSS circuit and said second current limit regulator being responsive to the output of said SSS circuit for controlling respective ones of said PMCs for protection against faulty connection of the interface to the EEPE with the interface in the DI mode.

6. An integrated signal interface according to claim 3, wherein said means for measuring includes a current generator for providing a current output, said PMCs are two in number, first and second diodes each associated with each of the PMCs and receiving said current output, second and third multiplexors responsive to the forward voltage drop across each of said first and second diodes, and further comprising third and fourth comparators respectively including reference temperature limiting and temperature warning values, and said third and fourth comparators being responsive to the combined outputs of the third and fourth multiplexors for providing respective temperature limiting and temperature warning signals with the interface in the DO mode.

7. An integrated signal interface according to claim 3, wherein said SSS circuit further includes: a first multiplexor responsive to each one of said voltage outputs, a second multiplexor responsive to the measured drain source voltages, and a comparator responsive to said voltage outputs, the output of the comparator controlling each of the first and second multiplexors; and a second comparator responsive to each of the outputs of said first and second multiplexors for generating a signal representing a warning of excessive current and a signal indicating that current limitation is activated with the interface in the DO mode.

8. An integrated digital signal interface according to claim 7, wherein said interface is selectively programmable by mode control signals from said ECU to receive a relevant nominal voltage from said EEPE, and further comprising means for automatically switching over to receive a higher current at a suitable current limit in response to said signal representing warning of excessive current, whereby interface circuitry is not destroyed upon connection of a faulty reactive load to said output terminals with said interface in the DI mode.

9. An integrated digital signal interface according to claim 3, wherein said SSS circuit further includes: a first multiplexor responsive to each one of said voltage outputs, a second multiplexor responsive to the measured characteristic voltages of the PMCs, and a comparator responsive to the output voltages, the output of the comparator controlling each of the first and second multiplexors; and a second comparator responsive to each of the outputs of said first and second multiplexors for indicating the "ON/OFF" condition of the interface.

10. An integrated signal interface according to claim 2, wherein said mode select means is responsive to selected mode select signals from the ECU for selectively programming the interface in the DO mode and to the voltage level of a connected EEPE, said control means selecting one of said operating functions in response to the threshold values from the ECU for controlling the operation of said first and second current regulators.

11. An integrated signal interface according to claim 1, wherein at least one of the circuits of the control means is integrated as an application specified integrated circuit (ASIC) circuit.

12. An integrated signal interface according to claim 1, wherein a bi-polar switch is connected between the output terminals with the digital interface in the DI mode; said control means further comprising means for operating said PMCs in at least one of a pulsed and continuous operation to determine the "ON/OFF" condition of the interface by determining the state of said bi-polar switch; and said control means further comprising means for determining at least one of an "open circuit" and "short-circuit" condition of the interface with said PMCs in said at least one of a continuous and pulsed operation.

13. An integrated signal interface according to claim 1, wherein said control means and said PMCs comprise an integrated circuit.

* * * * *